United States Patent
Umeki et al.

(10) Patent No.: US 12,146,498 B2
(45) Date of Patent: Nov. 19, 2024

(54) VACUUM BLOWER

(71) Applicant: YAMABIKO CORPORATION, Ohme (JP)

(72) Inventors: Tomohisa Umeki, Ohme (JP); Kenji Suzuki, Ohme (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/410,585

(22) Filed: Jan. 11, 2024

(65) Prior Publication Data

US 2024/0254995 A1   Aug. 1, 2024

(30) Foreign Application Priority Data

Jan. 27, 2023 (JP) ................. 2023-010976

(51) Int. Cl.
*F04D 25/08* (2006.01)
*F04D 29/00* (2006.01)

(52) U.S. Cl.
CPC .......... *F04D 25/08* (2013.01); *F04D 29/002* (2013.01)

(58) Field of Classification Search
CPC ........ F04D 25/08; F04D 29/4226; A47L 5/14; A47L 9/08
See application file for complete search history.

(56) References Cited

U.S. PATENT DOCUMENTS

| 3,683,446 | A | * | 8/1972 | Tell | A47L 9/08 |
| | | | | | 15/409 |
| 4,817,230 | A | * | 4/1989 | Kiyooka | A47L 5/14 |
| | | | | | 15/409 |
| 5,450,649 | A | * | 9/1995 | Turnbull | A47L 5/14 |
| | | | | | 15/345 |
| 5,477,585 | A | * | 12/1995 | Hentzschel | A47L 5/14 |
| | | | | | 15/345 |
| 6,141,824 | A | * | 11/2000 | Fujiwara | A47L 5/14 |
| | | | | | 15/330 |
| 2022/0233036 | A1 | * | 7/2022 | Suzuki | E01H 1/12 |

FOREIGN PATENT DOCUMENTS

JP   2022-114780 A   8/2022

* cited by examiner

*Primary Examiner* — Woody A Lee, Jr.
*Assistant Examiner* — Cameron A Corday
(74) *Attorney, Agent, or Firm* — Crowell & Moring LLP

(57) ABSTRACT

Provided is a vacuum blower, when used as a vacuum for sucking work, capable of increasing air flow with a larger volume of air sucked from a suction port and increasing the initial velocity (sucking rate) of sucked objects near the suction port, and when used as a blower for blowing work, capable of delivering rectilinearly directed wind from the blowing port and quickly switching between sucking work and blowing work. By sliding an inner pipe disposed inside a pipe relative to the pipe, opposite end portions of the inner pipe come into close contact with opposite end portions (turn portions) of a nozzle facing the opposite end portions of the inner pipe, such that one ejection port is closed and the other ejection port is opened to allow pressurized wind generated by a blower fan to be ejected along the inside of the inner pipe to switch between sucking state and blowing state.

7 Claims, 10 Drawing Sheets

VACUUM BLOWER

CROSS REFERENCE TO RELATED APPLICATIONS

The present application claims priority from Japanese patent application JP 2023-010976 filed on Jan. 27, 2023, the entire content of which is hereby incorporated by reference into this application.

BACKGROUND

Technical Field

The present invention relates to a vacuum blower configured to perform sucking work to suck in dust and debris and blowing work to blow out dust and debris.

Background Art

There is known a conventional technique of a vacuum used in work to suck in and collect dust and debris such as fallen leaves (hereinafter referred to as "sucking work") disclosed, for example, in JP 2022-114780 A. FIG. 8 to FIG. 10 illustrate an exemplary configuration of the conventional vacuum disclosed in JP 2022-114780 A.

A vacuum 1A of the illustrated conventional example is a handheld electric vacuum configured to perform sucking work, including: a pipe 10 including a suction port 10A at one end and a discharge port 10B at the other end; a blower fan 20 provided outside the pipe 10 and driven by an electric motor; a handle 30 provided outside the pipe 10 and near the discharge port 10B in a longitudinal direction of the pipe 10, and configured to be held by a hand; and an ejector 40A provided near the suction port 10A in the longitudinal direction of the pipe 10, and configured to feed pressurized wind generated by the blower fan 20 into the pipe 10 from around the pipe 10, and to eject the pressurized wind to the discharge port 10B. A battery 50 configured to supply the electric motor with power is attached to the outside of the pipe 10 near the discharge port 10B. The pressurized wind ejected from the ejector 40A passes through the inside of the pipe 10 along the inner surface of the pipe 10 and is ejected to the discharge port 10B. This pressurized wind causes the pressure inside the pipe 10 to be lowered, thereby to generate suction flow (negative pressure) in the pipe 10 from the suction port 10A toward the discharge port 10B. Accordingly, the vacuum 1A sucks in dust and so forth into the pipe 10 from the suction port 10A provided at one end of the pipe 10, and discharges the sucked objects such as the dust from the discharge port 10B provided at the other end of the pipe 10 to collect the sucked objects in a collector (not shown), such as a bag, attached to the discharge port 10B.

In addition, in the vacuum 1A of the illustrated conventional example, the pipe 10 includes a front pipe 11 having the suction port 10A, and a pipe body 12 having the discharge port 10B at the base end, the front pipe 11 is connected to the front end of the pipe body 12, and the ejector 40A ejects the pressurized wind along the outside (outer circumferential surface) of the front pipe 11 inserted into the pipe body 12.

The front pipe 11 is slidably connected to the pipe body 12, and a division plate 11A is provided on the periphery of the front pipe 11 and configured to switch between the discharge port 10B and the suction port 10A to which the pressurized wind fed by the ejector 40A is ejected (FIG. 9, FIG. 10).

When the front pipe 11 is slid toward the front end, the division plate 11A contacts a stopper provided at the edge of a circular flow path 41 on the front end side (the circular flow path 41 provided around a central axis P of the pipe 10, into which pressurized wind generated by the blower fan 20 is introduced). By this means, the division plate 11A blocks the pressurized wind flowing from the circular flow path 41 toward the front end of the pipe 10, and therefore the pressurized wind entering from the circular flow path 41 into the pipe 10 is ejected to the discharge port 10B along the periphery of the front pipe 11. In this state, the front end of the front pipe 11 is the suction port 10A, and suction flow is formed in the pipe 10 from the front end portion toward the base end portion of the pipe 10 as shown in the arrows in FIG. 9 (the sucking state in FIG. 9).

On the other hand, when the front pipe 11 is slid toward the base end, the division plate 11A contacts a stopper provided at the edge of the circular flow path 41 on the base end side. By this means, the division plate 11A blocks the pressurized wind flowing from the circular flow path 41 toward the base end of the pipe 10, and therefore the pressurized wind entering from the circular flow path 41 into the pipe 10 is ejected to the front end (suction port 10A) along the periphery of the front pipe 11. In this state, the front end of the front pipe 11 serves as a blowing port, and discharge flow is formed in the pipe 10 from the base end to the front end of the pipe 10 as shown in the arrows in FIG. 10 (the blowing state in FIG. 10).

The vacuum 1A of the illustrated conventional example can switch between the sucking work and the blowing work with a single machine body by incorporating such a switching configuration. Note that the vacuum having such a switching configuration becomes a working machine serving as a vacuum and a blower and may be referred to as a vacuum blower.

SUMMARY

When the above-described conventional vacuum blower is used as a vacuum to perform sucking work, the pressurized wind entering from the circular flow path 41 into the pipe 10 is ejected to the discharge port 10B along the periphery of the front pipe 11, at a position spaced from the suction port 10A at the front end of the front pipe 11 (by a distance corresponding to the length of the front pipe 11). Therefore, in the conventional vacuum blower, it is difficult to increase the flow rate of air (air flow) sucked (drawn) from the suction port and to increase the initial velocity (sucking rate) of sucked objects near the suction port.

When the above-described conventional vacuum blower is used as a blower to perform blowing work, the pressurized wind entering from the circular flow path 41 into the pipe 10 is ejected circumferentially (in a doughnut shape) to the front end (suction port 10A) along the periphery of the front pipe 11. This causes the conventional vacuum blower to blow out the pressurized wind in a slightly diffused manner from the blowing port, and it is difficult to deliver rectilinearly directed wind.

Furthermore, the above-described conventional vacuum blower can switch between the sucking work and the blowing work with the configuration that the front pipe 11 is slid relative to the pipe body 12 and the division plate 11A provided on the periphery of the front pipe 11 contacts a stopper provided at the edge of the circular flow path 41 on the front end side or the base end side. Thus, the switching in the conventional vacuum blower requires a large amount of slide of the front pipe 11, and it is difficult to achieve quick switching.

The present invention has been made in view of the above issue, and it is an object of the present invention to provide a vacuum blower, when used as a vacuum to perform sucking work, capable of increasing the air flow with a larger volume of air sucked from a suction port and increasing the initial velocity (sucking rate) of sucked objects near the suction port, and when used as a blower to perform blowing work, capable of delivering rectilinearly directed wind from the blowing port and quickly switching between the sucking work and the blowing work.

To address the above issue, the vacuum blower according to the present invention is a vacuum blower configured to perform sucking work and blowing work, including: a pipe including a suction port and a discharge port; a blower fan driven by a driving source; and a nozzle provided near the suction port of the pipe, and configured to feed pressurized wind generated by the blower fan into the pipe from around the pipe, and to eject the pressurized wind to the discharge port. The nozzle includes an inner pipe disposed inside of the pipe so as to be slidable relative to the pipe. By sliding the inner pipe relative to the pipe, the nozzle is configured to switch between: a sucking state, where a base end portion of the inner pipe comes into close contact with a base end portion of the nozzle facing the base end portion of the inner pipe, a front end portion of the inner pipe is separated from a front end portion of the nozzle facing the front end portion of the inner pipe, and the pressurized wind generated by the blower fan and fed to an outside of the inner pipe is ejected to the discharge port along an inside of the inner pipe; and a blowing state, where the front end portion of the inner pipe comes into close contact with the front end portion of the nozzle facing the front end portion of the inner pipe, the base end portion of the inner pipe is separated from the base end portion of the nozzle facing the base end portion of the inner pipe, and the pressurized wind generated by the blower fan and fed to the outside of the inner pipe is ejected to the suction port along the inside of the inner pipe.

In a preferred aspect, the front end portion of the nozzle includes a front end turn portion disposed around the front end portion of the inner pipe, and in the sucking state, the pressurized wind generated by the blower fan and fed to the outside of the inner pipe turns toward a base end at around the front end portion of the inner pipe, and is ejected to the discharge port along the inside of the inner pipe from a front end ejection port formed between the front end turn portion and the inner pipe. The base end portion of the nozzle includes a base end turn portion disposed around the base end portion of the inner pipe, and in the blowing state, the pressurized wind generated by the blower fan and fed to the outside of the inner pipe turns toward a front end at around the base end portion of the inner pipe, and is ejected to the suction port along the inside of the inner pipe from a base end ejection port formed between the base end turn portion and the inner pipe.

In another preferred aspect, the front end ejection port or the base end ejection port is provided radially outward of a narrowest portion of the inner pipe, the narrowest portion being provided nearer to the base end than the front end ejection port or being provided nearer to the front end than the base end ejection port.

In further preferred aspect, the vacuum blower according to the present invention further includes: a rotary operating member that is rotatable about an axis of the pipe; and a cam mechanism for sliding the inner pipe relative to the pipe according to rotation of the rotary operating member.

In still another preferred aspect, the rotary operating member is provided in the front end portion of the nozzle.

In yet another preferred aspect, the front end turn portion serves as the rotary operating member, and the front end turn portion and the inner pipe form the cam mechanism.

In yet another preferred aspect, the rotary operating member is provided in the base end portion of the nozzle.

In yet another preferred aspect, the base end turn portion serves as the rotary operating member, and the base end turn portion and the inner pipe form the cam mechanism.

According to the present invention, by sliding the inner pipe disposed inside of the pipe relative to the pipe, the opposite end portions of the inner pipe come into close contact with the opposite end portions (turn portions) of the nozzle facing the opposite end portions of the inner pipe, such that one of the ejection ports is closed and the other one of the ejection ports is opened to allow the pressurized wind generated by the blower fan to be ejected along the inside of the inner pipe to switch between the sucking state and the blowing state. Accordingly, when used as a vacuum to perform sucking work, it is possible to increase the air flow with a larger volume of air sucked from the suction port and to increase the initial velocity (sucking rate) of sucked objects near the suction port. Meanwhile, when used as a blower to perform blowing work, it is possible to deliver rectilinearly directed wind from the blowing port. In addition, it is possible to reduce the amount of slide of the inner pipe relative to the pipe required for the switching and to achieve quick switching between the sucking work and the blowing work.

DETAILED DESCRIPTION

Hereinafter, embodiments of the present invention will be described with reference to the drawings. In the following description, the same reference numbers in the different drawings indicate the same functional sections, and therefore repeated description for each of the drawings will be omitted.

Figure 8:
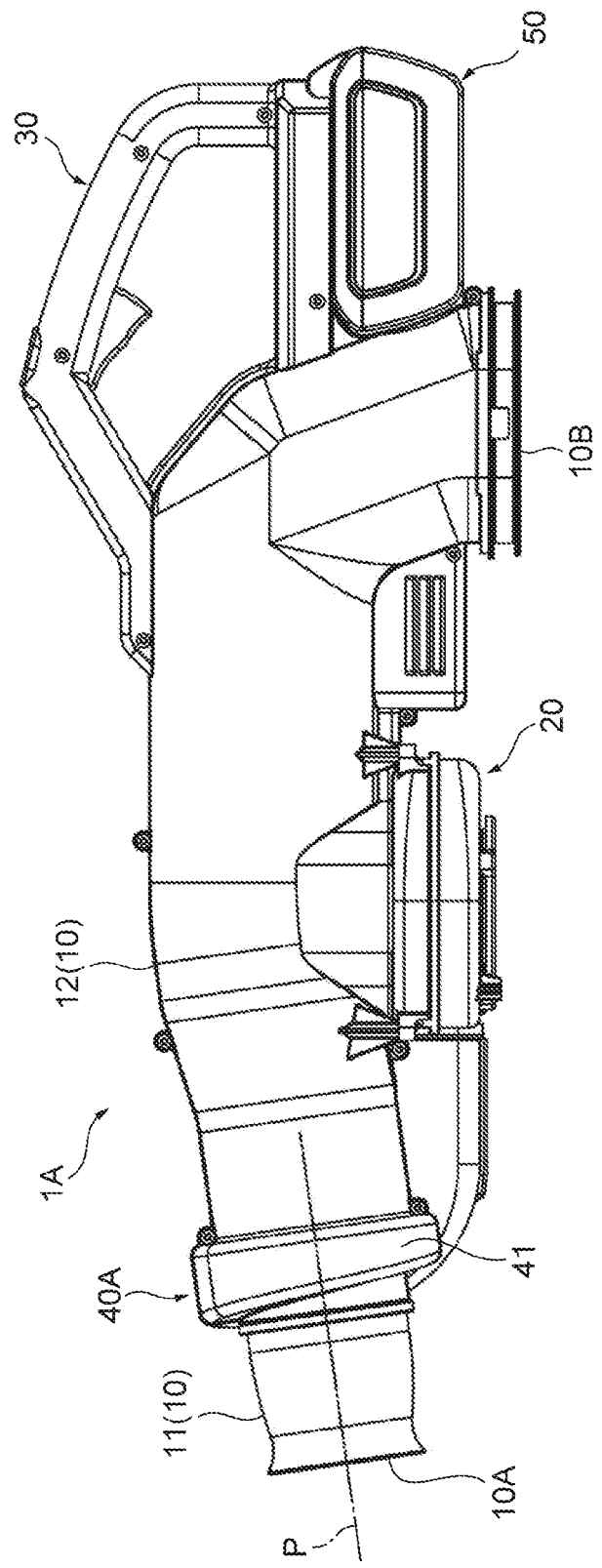
FIG. 8 is a side view of a conventional vacuum.
Figure 9:
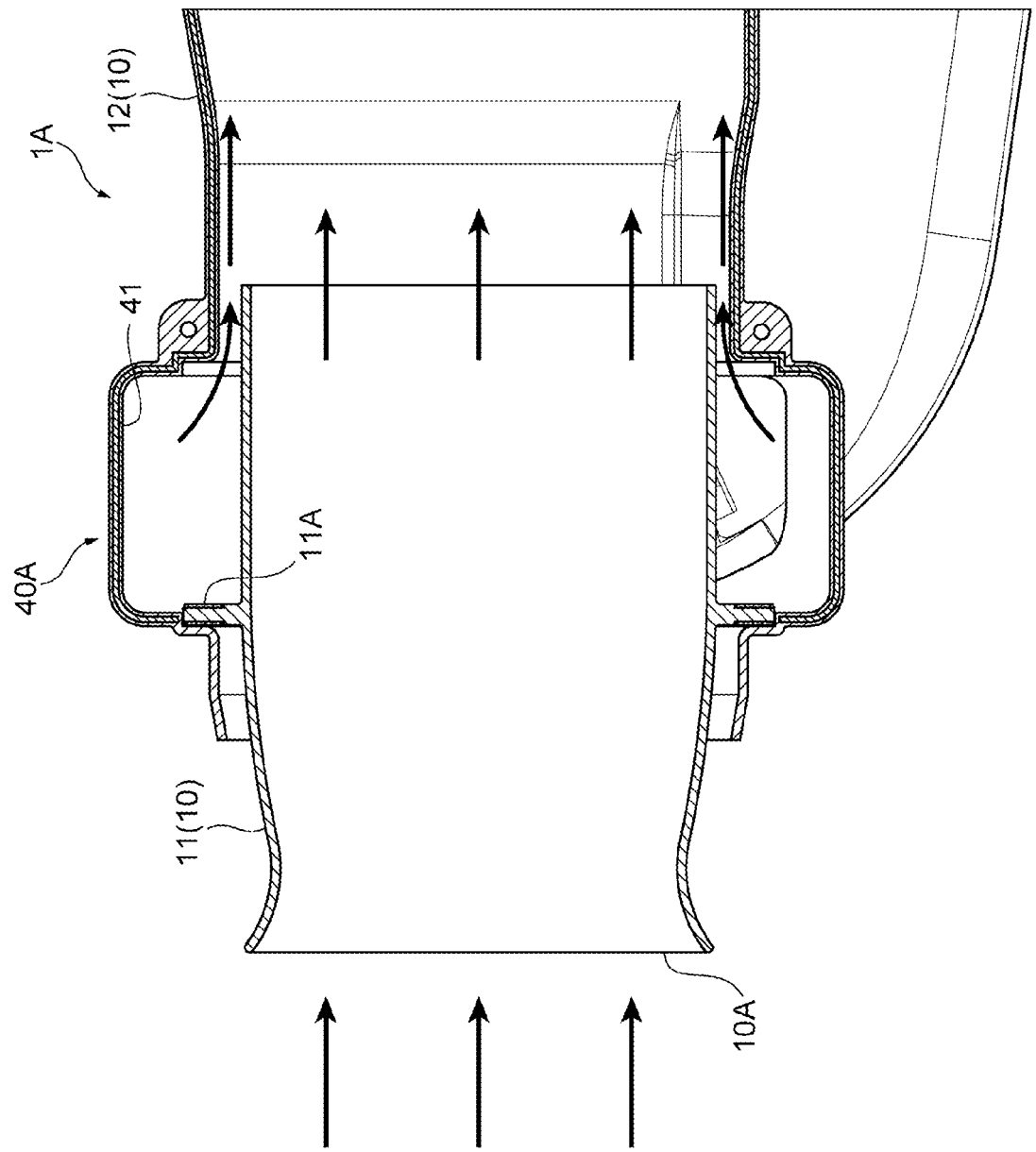
FIG. 9 is an enlarged vertical cross-sectional view of a main portion around an ejector 40A of FIG. 8 (a sucking state)
Figure 10:
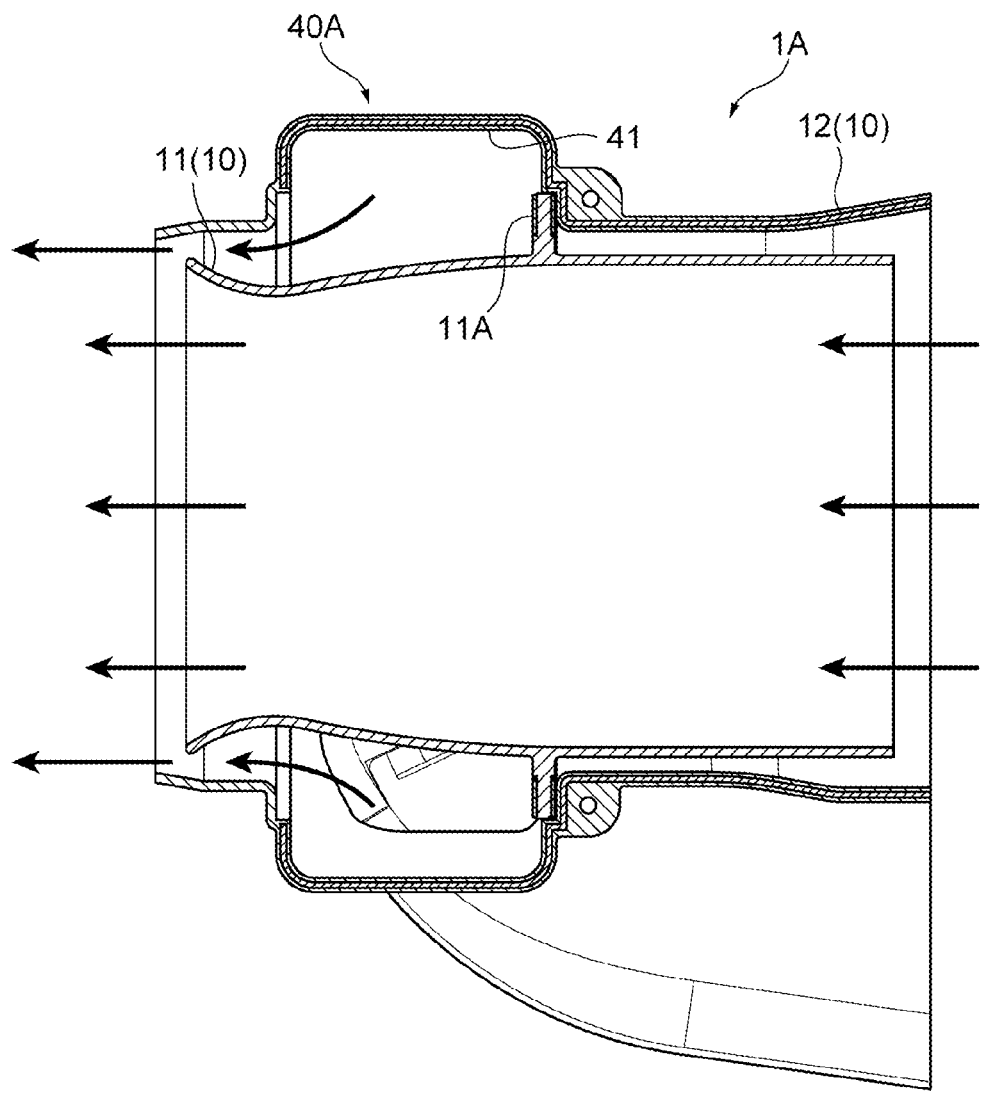
FIG. 10 is an enlarged vertical cross-sectional view of the main portion around the ejector 40A of FIG. 8 (a blowing state).

A vacuum blower 1 of the present embodiment can switch between sucking work and blowing work by incorporating a switching configuration like the vacuum 1A of the conventional example shown in FIG. 8 to FIG. 10. Hereinafter, first, the switched state for the sucking work will be described with reference to FIG. 1 and FIG. 3. Next, the switched state for the blowing work will be described with reference to FIG. 2 and FIG. 3. Note that refer to FIG. 8 for the reference numbers other than those shown in FIG. 1 to FIG. 3.

Like the vacuum 1A of the conventional example, the vacuum blower (hereinafter this may be simply referred to as a vacuum) 1 of the present embodiment is a handheld working machine for the sucking work, and includes a pipe 10 configured to suck in dust and debris, a blower fan 20, a handle 30, and a nozzle 40. That is, the vacuum 1 of the present embodiment includes the nozzle 40 instead of the ejector 40A of the vacuum 1A of the conventional example.

In the vacuum 1 of the present embodiment, basically, the functions of the components (the pipe 10, the blower fan 20, the handle 30, and the like) other than the nozzle 40 are substantially similar to those of the vacuum TA of the conventional example. Thus, the nozzle 40, which is a characteristic portion of the present embodiment, will mainly be described.

However, it is needless to mention that the shape and layout configuration of the components (the pipe 10, the blower fan 20, the handle 30, and the like) other than the nozzle 40 are not limited to those of the conventional example shown in FIG. 8, and may be modified appropriately. For example, the blower fan 20 may be driven by a driving source such as an engine, instead of a built-in electric motor. In addition, the blower fan 20 may not be attached to the outside of the pipe 10.

The nozzle 40 is provided near a suction port TOA in a longitudinal direction of the pipe 10, and configured to feed pressurized wind generated by the blower fan 20 from around the pipe 10 into the pipe 10 and eject the pressurized wind to a discharge port 10B. The pressurized wind is ejected from the nozzle 40 to the discharge port 10B along the inner surface of the pipe 10. This pressurized wind causes the pressure inside the pipe 10 to be lowered, thereby to generate suction flow in the pipe 10 from the suction port 10A toward the discharge port 10B.

The nozzle 40 includes a circular flow path 41 protruding outward of the pipe 10. The circular flow path 41 is provided circumferentially around a central axis P of the pipe 10. The pressurized wind generated by the blower fan 20 is introduced into the circular flow path 41 via a pressure flow path 25.

The circular flow path 41 includes an ejection port (front end ejection port) 42 that is an opening configured to communicate with the inside of the pipe 10 over the entire circumference around the central axis P of the pipe 10. The pressurized wind is ejected through the ejection port 42 along the inner surface of the pipe 10. When ejected to the pipe 10 through the ejection port 42, the pressurized wind may contain a circumferential component. By this means, swirling flow along the inner wall of the pipe 10 is added, thereby to increase suction force near the inner wall of the pipe 10.

Figure 1:
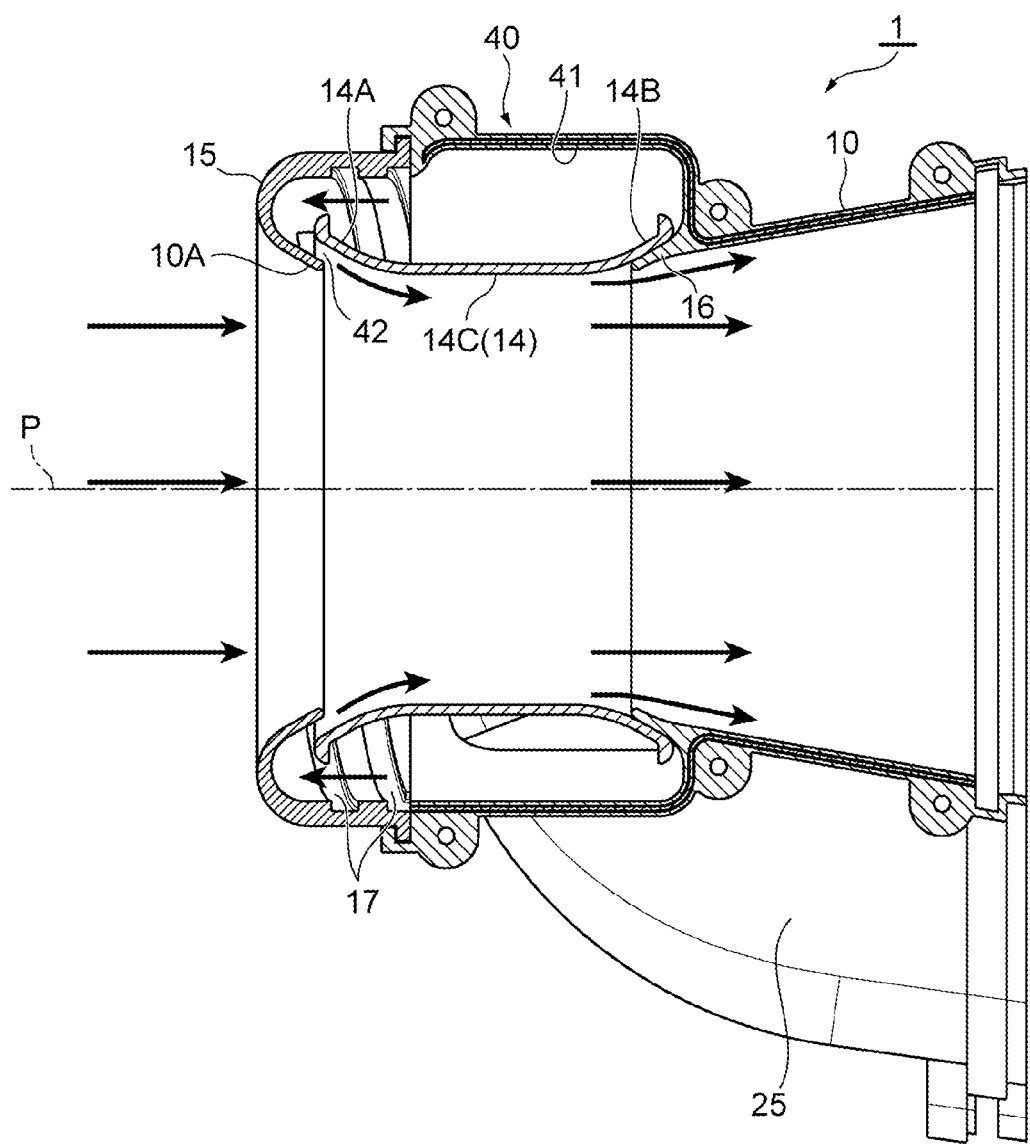
FIG. 1 is an enlarged vertical cross-sectional view of a main portion around a nozzle of a vacuum blower according to an embodiment of the present invention (a sucking state)

In the present embodiment, as shown in FIG. 1, the nozzle 40 includes an inner pipe 14 inserted into the inside of the circular flow path 41 of the pipe 10. The inner pipe 14 is disposed substantially coaxially with the central axis P of the pipe 10. The inner pipe 14 includes, at its opposite end portions, flared portions 14A, 14B gradually expanding in diameter toward the outside. A narrowest portion 14C is formed between these flared portions 14A, 14B (with a predetermined length in the longitudinal direction). In other words, the inner pipe 14 includes, in its central portion, the narrowest portion 14C with a predetermined length in the longitudinal direction (the direction along the central axis P). The portion of the inner pipe 14 nearer to the front end (the front side) than the narrowest portion 14C is the flared portion 14A gradually expanding in diameter from the narrowest portion 14C toward the front (i.e., gradually reducing in diameter to the narrowest portion 14C toward the back). In addition, the portion of the inner pipe 14 nearer to the base end (the back side) than the narrowest portion 14C is the flared portion 14B gradually expanding in diameter from the narrowest portion 14C toward the back.

In the present embodiment, the inner pipe 14 is configured to be slidable relative to the circular flow path 41 along the central axis P (in the direction along the central axis P) by a cam mechanism, which will be described later.

In addition, the nozzle 40 includes a turn portion (front end turn portion) 15 disposed on the front end side (i.e., the front end portion of the pipe 10) of the circular flow path 41 of the pipe 10, (in an annular shape) around the front end portion of the inner pipe 14. The turn portion 15 is formed in an annular shape around the central axis P of the pipe 10 such that it turns from the outside to the inside of the front end portion of the inner pipe 14 and toward the base end side. In the present embodiment, the turn portion 15 basically includes a (cornerless) continuous curved surface. The inside (inner circumferential surface) of the turn portion 15 is the suction port 10A of the pipe 10, and a gap formed between the turn portion 15 and the inner pipe 14 (or the front end portion thereof) is the ejection port (front end ejection port) 42 configured to communicate with (i.e., open to) the inside of the pipe 10 in the circular flow path 41.

Figure 3:
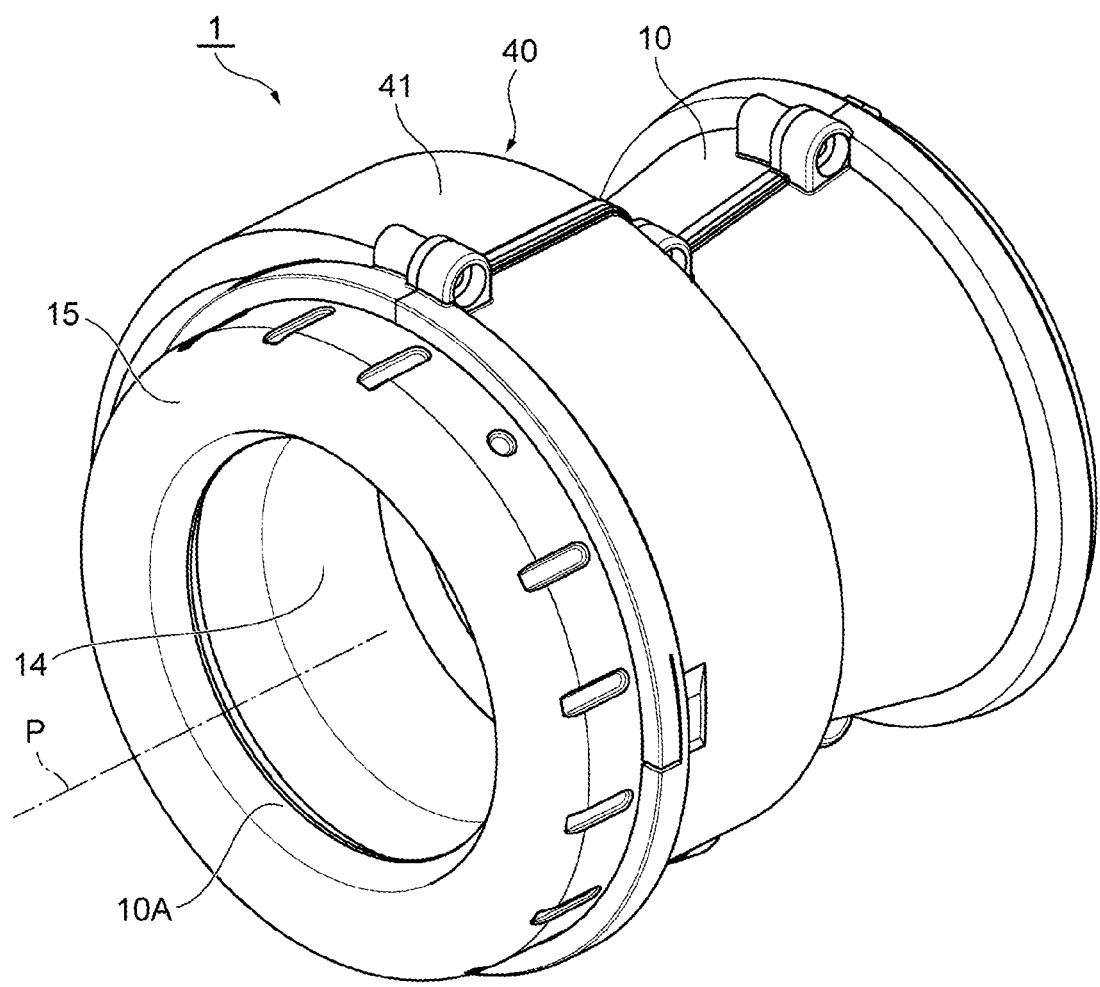
FIG. 3 is an enlarged perspective view of the main portion around the nozzle of the vacuum blower according to the embodiment of the present invention.
Figure 4:
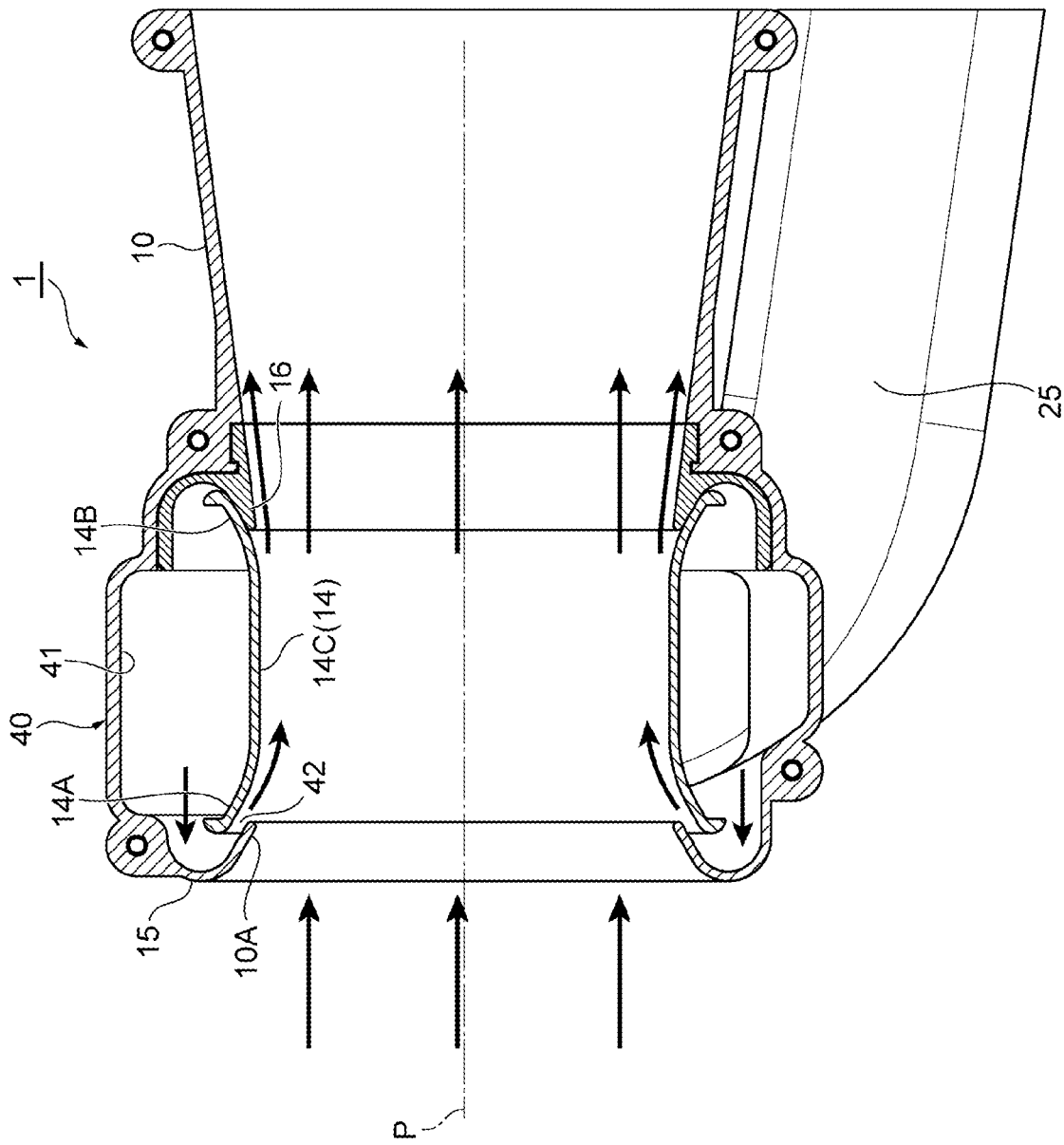
FIG. 4 is an enlarged vertical cross-sectional view of a main portion around a nozzle of a vacuum blower according to another embodiment of the present invention (a sucking state)

In the present embodiment, the turn portion 15 includes a ring-shaped member configured to be rotatable about the central axis P of the pipe 10 to allow switching between sucking work and blowing work (see also FIG. 3).

In addition, the nozzle 40 includes a turn portion (base end turn portion) 16 disposed on the base end side of the circular flow path 41 of the pipe 10, (in an annular shape) around the base end portion of the inner pipe 14. The turn portion 16 is formed in an annular shape around the central axis P of the pipe 10 such that it turns from the outside to the inside of the base end portion of the inner pipe 14 and toward the front end side. In the present embodiment, the turn portion 16 basically includes a (cornerless) continuous curved surface. The inside (inner circumferential surface) of the turn portion 16 is formed to be smoothly continuous to the inner wall of the pipe 10.

In the sucking state shown in FIG. 1, the base end portion of the inner pipe 14 is in close contact with (i.e., hermetically contacts) the turn portion 16, and the base end of the circular flow path 41 is closed by the base end portion of the inner pipe 14.

In the present embodiment, the turn portion 16 includes a ring-shaped member formed integrally with the pipe 10.

By this means, the pressurized wind is fed from the circular flow path 41 of the nozzle 40 toward the outside of the inner pipe 14, then the pressurized wind fed to the outside of the inner pipe 14 passes between the turn portion 15 and the inner pipe 14 and turns toward the base end at around the front end portion of the inner pipe 14, and is ejected through the ejection port 42 to the discharge port 10B along the inside (inner circumferential surface) of the inner pipe 14.

In the present embodiment, as viewed in the direction along the central axis P, the ejection port 42 is provided radially outward of the narrowest portion 14C (or the inner wall thereof) of the inner pipe 14, the narrowest portion 14C being provided nearer to the base end (discharge port 10B) than the ejection port 42. Therefore, the pressurized wind ejected through the ejection port 42 is smoothly fed to the discharge port 10B along the inside (inner circumferential surface) of the inner pipe 14.

The vacuum 1 configured as described above forms suction flow in the pipe 10 from the suction port 10A at one end to the discharge port 10B at the other end. In addition, there is no reduced diameter portion in the pipe 10 in the portion from the narrowest portion to the discharge port 10B, and therefore the pipe 10 maintains its inside diameter which is sufficient to allow large sucked objects to pass therethrough along the longitudinal direction.

By this means, the objects sucked by the vacuum 1 from the suction port 10A into the pipe 10 can be efficiently guided to the discharge port 10B, and even when large objects are sucked from the suction port 10A, the sucked objects can be smoothly guided to the discharge port 10B without clogging or the like, and then can be collected.

In addition, the vacuum 1 of the present embodiment can switch between sucking work (also referred to as a vacuum mode) and blowing work (also referred to as a blower mode) by incorporating a simple switching mechanism into the above-described nozzle 40.

As the switching mechanism, the inner pipe 14 is slidably connected to the circular flow path 41, and according to the slide of this inner pipe 14, the opposite end portions of the inner pipe 14 come into contact with or are separated from the turn portions 15, 16 provided in the opposite end portions of the nozzle 40 so as to face the opposite end portions of the inner pipe 14. With this configuration, the vacuum 1 of the present embodiment switches between the discharge port 10B and the suction port TOA to which the pressurized wind fed by the nozzle 40 is ejected.

In the present embodiment, the turn portion 15 provided in the front end portion of the nozzle 40 (or the circular flow path 41 thereof) is configured to be rotatable about the central axis P of the pipe 10. The base end portion of the turn portion 15 includes, in its inner circumferential portion, a helical groove 17, and the front end of the inner pipe 14 includes, in its outer circumferential portion, a projection (not shown) that fits to the helical groove 17. The helical groove 17 of the turn portion 15 and the projection of the inner pipe 14 form a cam mechanism that slides the inner pipe 14 relative to the circular flow path 41 according to the rotation of the turn portion 15. In other words, the turn portion 15 provided in the front end portion of the nozzle 40 (or the circular flow path 41 thereof) serves as a rotary operating member that is rotatable about the central axis P of the pipe 10 to slide the inner pipe 14 relative to the circular flow path 41.

Note that the configuration of sliding the inner pipe 14 relative to the circular flow path 41 is not limited to the illustrated example.

With this configuration, when the inner pipe 14 is slid toward the front end from the sucking state shown in FIG. 1, the front end portion of the inner pipe 14 comes into close contact with (i.e., hermetically contacts) the turn portion 15, the front end of the circular flow path 41 is closed by the front end portion of the inner pipe 14, the base end portion of the inner pipe 14 is separated from the turn portion 16, and a gap formed between the turn portion 16 and the inner pipe 14 (or the base end portion thereof) becomes an ejection port (base end ejection port) 43 configured to communicate with (i.e., open to) the inside of the pipe 10 in the circular flow path 41. The pressurized wind is ejected from the ejection port (base end ejection port) 43 to the front end (suction port TOA) (the blowing state shown in FIG. 2).

FIG. 1 shows the switched state for the sucking work as described above. In this state, the inner pipe 14 is slid toward the base end, the base end portion (flared portion 14B) of the inner pipe 14 is in contact with (close contact with) the turn portion 16 provided on the base end side of the circular flow path 41, and the front end portion (flared portion 14A) of the inner pipe 14 is separated from the turn portion 15 provided on the front end side of the circular flow path 41. Accordingly, the base end of the circular flow path 41 is closed, and the pressurized wind is fed from the circular flow path 41 to the outside of the inner pipe 14, then passes between the turn portion 15 and the inner pipe 14, turns toward the base end at around the front end portion of the inner pipe 14, enters the pipe 10 through the ejection port (front end ejection port) 42, and is ejected to the discharge port 10B along the inner periphery of the inner pipe 14. In this state, the turn portion 15, that is, the front end of the pipe 10, is the suction port 10A, and suction flow is formed in the pipe 10 from the front end portion toward the base end portion of the pipe 10.

Figure 2:
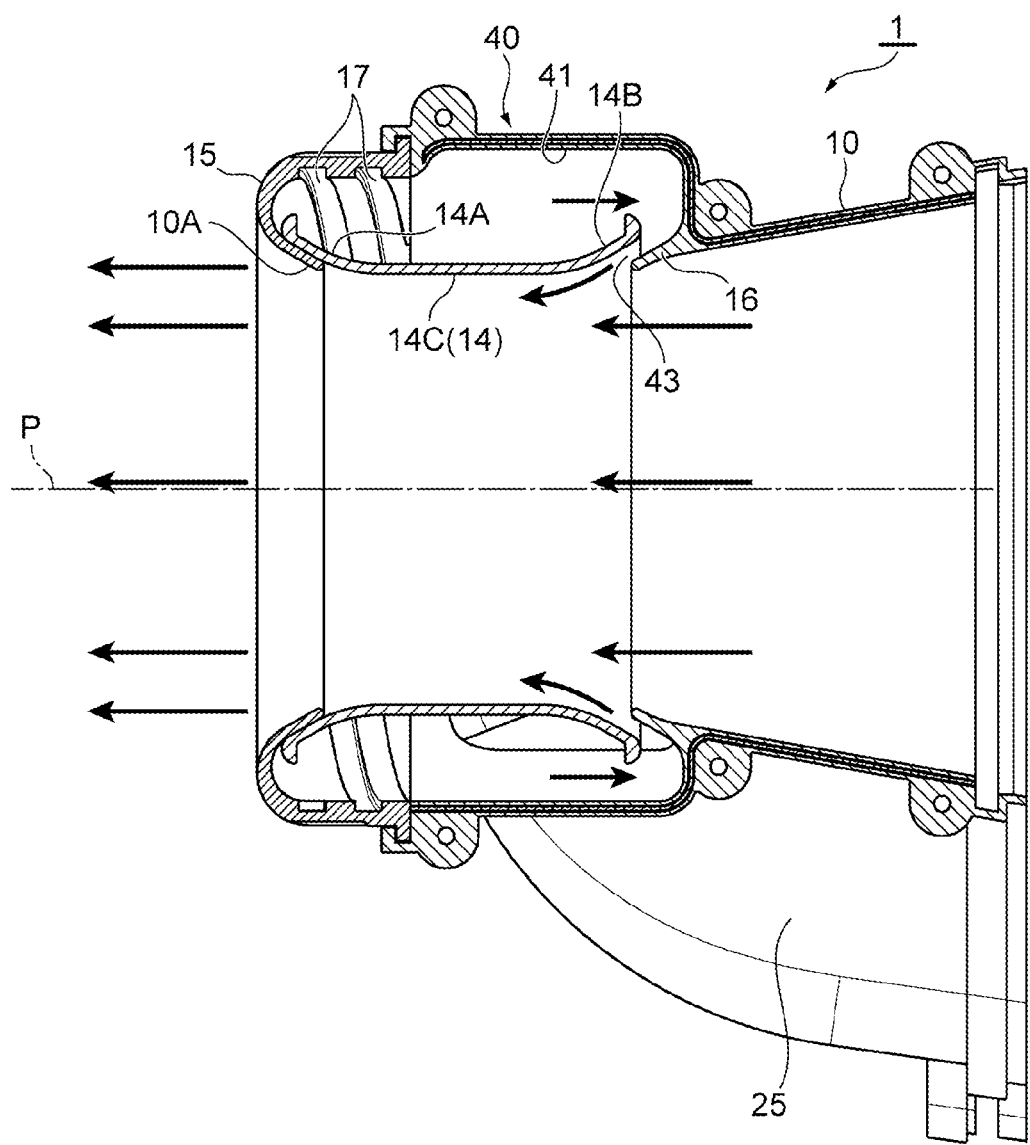
FIG. 2 is an enlarged vertical cross-sectional view of the main portion around the nozzle of the vacuum blower according to the embodiment of the present invention (a blowing state)

On the other hand, FIG. 2 shows the switched state for the blowing work. In this state, the inner pipe 14 is slid toward the front end, the front end portion (flared portion 14A) of the inner pipe 14 is in contact with (close contact with) the turn portion 15 provided on the front end side of the circular flow path 41, and the base end portion (flared portion 14B) of the inner pipe 14 is separated from the turn portion 16 provided on the base end side of the circular flow path 41. Accordingly, the front end of the circular flow path 41 is closed, and the pressurized wind is fed from the circular flow path 41 to the outside of the inner pipe 14, then passes between the turn portion 16 and the inner pipe 14, turns toward the front end at around the base end portion of the inner pipe 14, enters the pipe 10 through the ejection port (base end ejection port) 43, and is ejected to the front end (suction port 10A) along the inner periphery of the inner pipe 14. In this state, the turn portion 15, that is, the front end of the pipe 10, serves as a blowing port, and discharge flow is formed in the pipe 10 from the base end to the front end of the pipe 10.

As described above, the vacuum 1 according to the present embodiment becomes a working machine serving as a vacuum and a blower by incorporating a simple switching mechanism. In other words, the vacuum 1 according to the present embodiment can switch between the vacuum and the blower by simple switching operation. When used to clean up fallen leaves in a wide area, for example, the vacuum 1 according to the present embodiment is switched to the blower to gather the fallen leaves spread on the ground to some extent, and then switched to the vacuum to suck in the gathered fallen leaves or the like. By this means, it is possible to allow efficient collecting work with a single machine.

FIG. 4 to FIG. 7 show another embodiment of the above-described switching mechanism.

In the other embodiment shown in FIG. 4 to FIG. 7, a turn portion (front end turn portion) 15 includes a ring-shaped member formed integrally with the pipe 10. Meanwhile, a turn portion (base end turn portion) 16 includes a ring-shaped member configured to be rotatable about the central axis P of the pipe 10. In other words, the turn portion (base end turn portion) 16 is housed in the pipe 10 so as to be rotatable about the central axis P of the pipe 10 (see, in particular, FIG. 4 and FIG. 5).

In this embodiment, the front end portion of the turn portion 16 includes, in its inner circumferential portion, a helical groove 18, and the base end portion of the inner pipe 14 includes, in its outer circumferential portion, a projection 19 that fits to the helical groove 18. The helical groove 18 of the turn portion 16 and the projection 19 of the inner pipe 14 form a cam mechanism that slides the inner pipe 14 relative to the circular flow path 41 according to the rotation of the turn portion 16 (see, in particular, FIG. 7). In other words, the turn portion 16 provided in the base end portion of the nozzle 40 (or the circular flow path 41 thereof) serves as a rotary operating member that is rotatable about the central axis P of the pipe 10 to slide the inner pipe 14 relative to the circular flow path 41.

Figure 6:
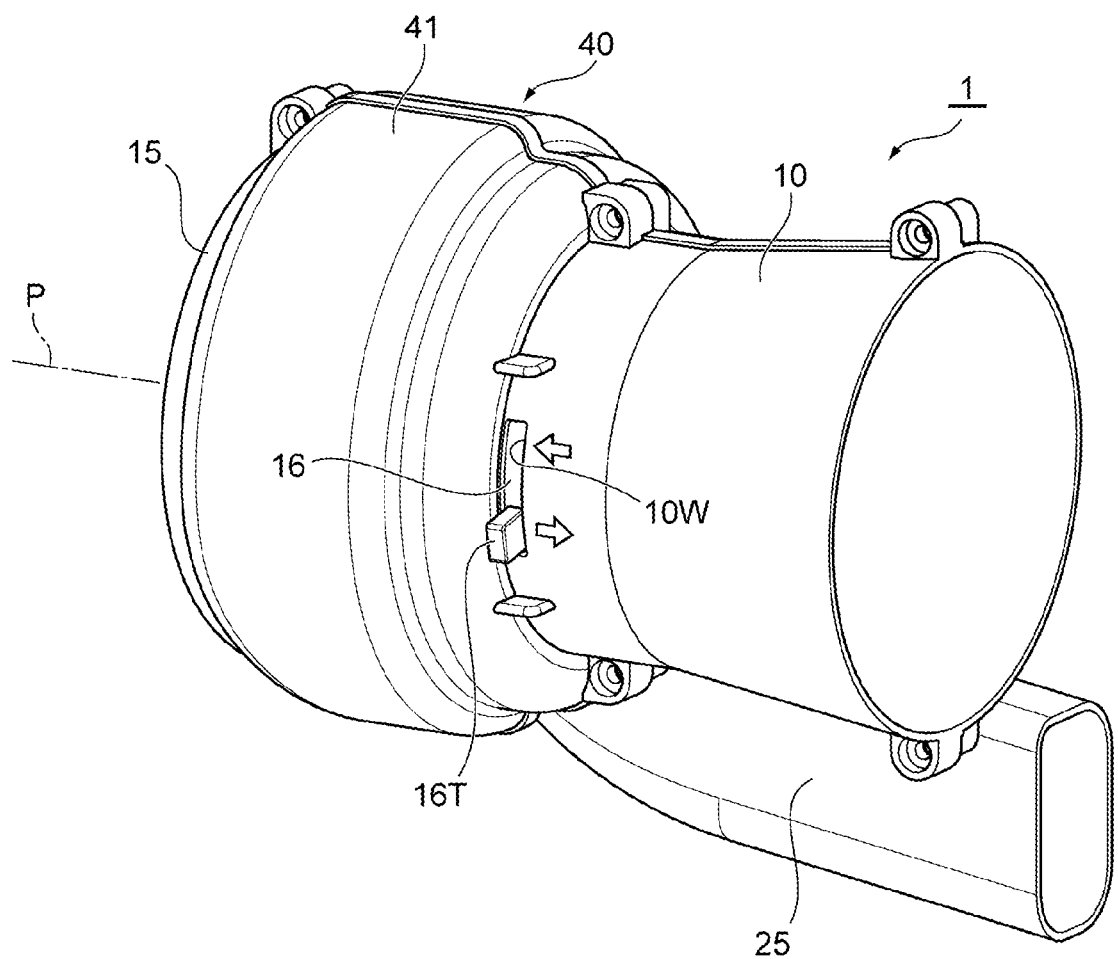
FIG. 6 is an enlarged perspective view of the main portion around the nozzle of the vacuum blower according to the other embodiment of the present invention.
Figure 7:
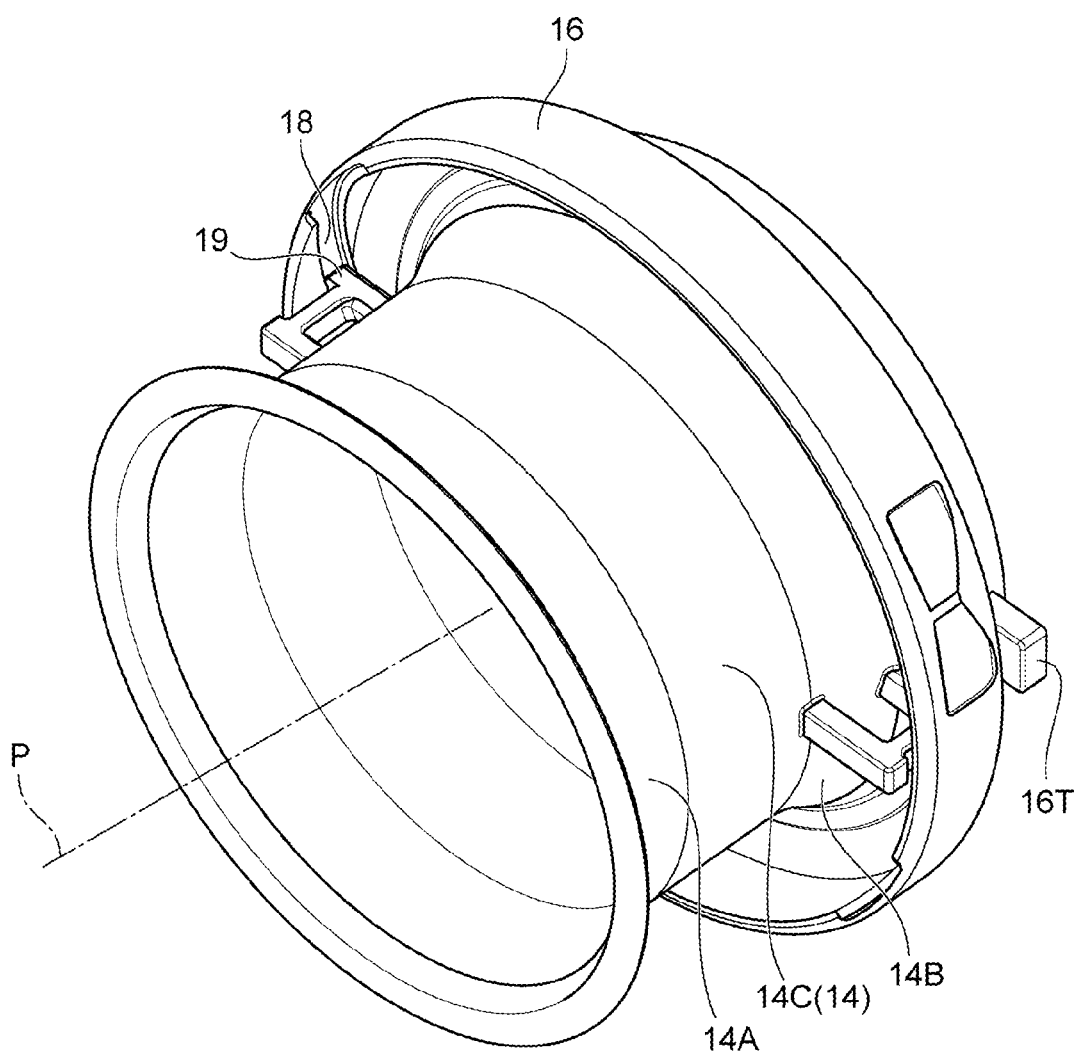
FIG. 7 is a perspective view of an internal configuration of a switching mechanism (cam mechanism) of FIG. 6.

The turn portion 16 includes, on its periphery, an operating projection 16T that projects beyond an opening TOW circumferentially extending in the pipe 10 to allow the turn portion 16 to rotate relative to the pipe 10 (see, in particular, FIG. 6).

Figure 5:
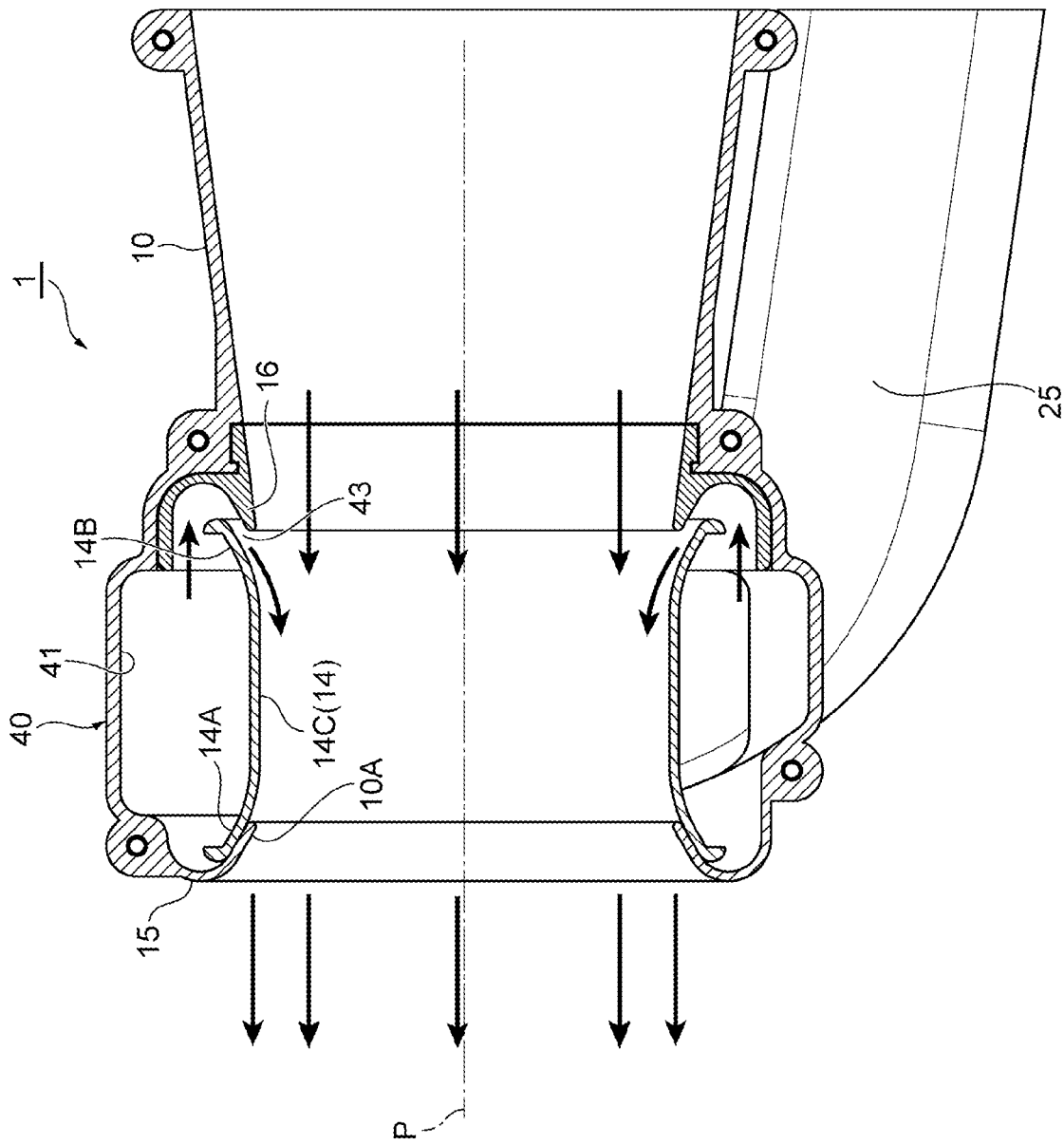
FIG. 5 is an enlarged vertical cross-sectional view of the main portion around the nozzle of the vacuum blower according to the other embodiment of the present invention (a blowing state)

With this switching mechanism as well, the vacuum 1 of the present embodiment can easily switch between the sucking work (FIG. 4) and the blowing work (FIG. 5). In the embodiment shown in FIG. 4 to FIG. 7, the rotary operating member (the turn portion 16 in the illustrated embodiment) of the switching mechanism is provided nearer to the base end (handle) as compared to the embodiment shown in FIG. 1 to FIG. 3. This can improve its operability.

As described above, in the vacuum (vacuum blower) 1 according to the present embodiment, the nozzle 40 includes the inner pipe 14 disposed inside of the pipe 10 (or the circular flow path 41 thereof) so as to be (axially) slidable relative to the pipe 10. By (axially) sliding the inner pipe 14 relative to the pipe 10, the vacuum (vacuum blower) 1 according to the present embodiment can switch between: a sucking state (FIG. 1 and FIG. 4), where the base end portion of the inner pipe 14 comes into close contact with the base end portion of the nozzle 40 facing the base end portion of the inner pipe 14, the front end portion of the inner pipe 14 is separated from the front end portion of the nozzle 40 facing the front end portion of the inner pipe 14, and the pressurized wind generated by the blower fan and fed to the outside of the inner pipe 14 (circular flow path 41) is ejected to the discharge port 10B along the inside (inner circumferential surface) of the inner pipe 14; and a blowing state (FIG. 2 and FIG. 5), where the front end portion of the inner pipe 14 comes into close contact with the front end portion of the nozzle 40 facing the front end portion of the inner pipe 14, the base end portion of the inner pipe 14 is separated from the base end portion of the nozzle 40 facing the base end portion of the inner pipe 14, and the pressurized wind generated by the blower fan and fed to the outside of the inner pipe 14 (circular flow path 41) is ejected to the suction port TOA (the front end side) along the inside (inner circumferential surface) of the inner pipe 14.

The front end portion of the nozzle 40 includes the front end turn portion 15 disposed (in an annular shape) around the front end portion of the inner pipe 14. In the sucking state (FIG. 1 and FIG. 4), the pressurized wind generated by the blower fan and fed to the outside of the inner pipe 14 (circular flow path 41) turns toward the base end at around the front end portion of the inner pipe 14, and is ejected to the discharge port 10B along the inside (inner circumferential surface) of the inner pipe 14 from the front end ejection port 42 formed between the front end turn portion 15 and the inner pipe 14. The base end portion of the nozzle 40 includes the base end turn portion 16 disposed (in an annular shape) around the base end portion of the inner pipe 14. In the blowing state (FIG. 2 and FIG. 5), the pressurized wind generated by the blower fan and fed to the outside of the inner pipe 14 (circular flow path 41) turns toward the front end at around the base end portion of the inner pipe 14, and is ejected to the suction port 10A (the front end side) along the inside (inner circumferential surface) of the inner pipe 14 from the base end ejection port 43 formed between the base end turn portion 16 and the inner pipe 14.

The front end ejection port 42 or the base end ejection port 43 is provided radially outward of the narrowest portion 14C (or the inner wall thereof) of the inner pipe 14, the narrowest portion 14C being provided nearer to the base end than the front end ejection port 42 or being provided nearer to the front end than the base end ejection port 43 (FIG. 1, FIG. 2, FIG. 4, and FIG. 5).

The vacuum blower 1 includes a rotary operating member that is rotatable about the axis (central axis P) of the pipe 10 and a cam mechanism for (axially) sliding the inner pipe 14 relative to the pipe 10 according to the rotation of the rotary operating member.

The rotary operating member is provided in the front end portion of the nozzle 40 (FIG. 1 to FIG. 3).

The front end turn portion 15 serves as the rotary operating member, and the front end turn portion 15 and the inner pipe 14 form the cam mechanism (FIG. 1 to FIG. 3).

The rotary operating member is provided in the base end portion of the nozzle 40 (FIG. 4 to FIG. 7).

The base end turn portion 16 serves as the rotary operating member, and the base end turn portion 16 and the inner pipe 14 form the cam mechanism (FIG. 4 to FIG. 7).

According to the present embodiment, by sliding the inner pipe 14 disposed inside of the pipe 10 relative to the pipe 10, the opposite end portions of the inner pipe 14 come into close contact with the opposite end portions (turn portions 15, 16) of the nozzle 40 facing the opposite end portions of the inner pipe 14, such that one of the ejection ports (42, 43) is closed and the other one of the ejection ports (43, 42) is opened to allow the pressurized wind generated by the blower fan 20 to be ejected along the inside of the inner pipe 14 to switch between the sucking state and the blowing state. Accordingly, when used as a vacuum to perform sucking work, with the ejection port 42 provided near the suction port 10A, it is possible to increase the air flow with a larger volume of air sucked from the suction port 10A and to increase the initial velocity (sucking rate) of sucked objects near the suction port 10A. Meanwhile, when used as a blower to perform blowing work, by ejecting the pressurized wind generated by the blower fan 20 along the inside of the inner pipe 14, it is possible to deliver rectilinearly directed wind from the blowing port. In addition, by bringing the opposite end portions of the inner pipe 14 into close contact with the opposite end portions (turn portions 15, 16) of the nozzle 40 facing the opposite end portions of the inner pipe 14 for switching between the sucking state and the blowing state, it is possible to reduce the amount of slide of the inner pipe 14 relative to the pipe 10 required for the switching and to achieve quick switching between the sucking work and the blowing work.

Although the embodiments of the present invention have been described in detail above with reference to the drawings, specific structures are not limited thereto, and any design changes that fall within the spirit and scope of the present invention are encompassed by the scope of the present invention. In addition, the embodiments described above can be combined using each other's technique as long as there is no inconsistency or problem particularly in the object, configuration, and the like.

What is claimed is:

1. A vacuum blower configured to perform sucking work and blowing work, comprising:
    a pipe including a suction port and a discharge port;
    a blower fan driven by a driving source; and
    a nozzle provided near the suction port of the pipe, and configured to feed pressurized wind generated by the blower fan into the pipe from around the pipe, and to eject the pressurized wind to the discharge port,
    wherein:
    the nozzle includes an inner pipe disposed inside of the pipe so as to be slidable relative to the pipe; and
    by sliding the inner pipe relative to the pipe, the nozzle is configured to switch between: a sucking state, where a base end portion of the inner pipe comes into close contact with a base end portion of the nozzle facing the base end portion of the inner pipe, a front end portion of the inner pipe is separated from a front end portion of the nozzle facing the front end portion of the inner pipe, and the pressurized wind generated by the blower fan and fed to an outside of the inner pipe is ejected to the discharge port along an inside of the inner pipe; and a blowing state, where the front end portion of the inner pipe comes into close contact with the front end portion of the nozzle facing the front end portion of the inner pipe, the base end portion of the inner pipe is separated from the base end portion of the nozzle facing the base end portion of the inner pipe, and the pressurized wind generated by the blower fan and fed to the outside of the inner pipe is ejected to the suction port along the inside of the inner pipe, and
    further wherein:
    the front end portion of the nozzle includes a front end turn portion disposed around the front end portion of the inner pipe, and in the sucking state, the pressurized wind generated by the blower fan and fed to the outside of the inner pipe turns toward a base end at around the front end portion of the inner pipe, and is ejected to the discharge port along the inside of the inner pipe from a front end ejection port formed between the front end turn portion and the inner pipe; and
    the base end portion of the nozzle includes a base end turn portion disposed around the base end portion of the inner pipe, and in the blowing state, the pressurized wind generated by the blower fan and fed to the outside of the inner pipe turns toward a front end at around the base end portion of the inner pipe, and is ejected to the suction port along the inside of the inner pipe from a base end ejection port formed between the base end turn portion and the inner pipe.

2. The vacuum blower according to claim 1, wherein the front end ejection port or the base end ejection port is provided radially outward of a narrowest portion of the inner pipe, the narrowest portion being provided nearer to the base end than the front end ejection port or being provided nearer to the front end than the base end ejection port.

3. The vacuum blower according to claim 1, further comprising:
    a rotary operating member that is rotatable about an axis of the pipe; and
    a cam mechanism for sliding the inner pipe relative to the pipe according to rotation of the rotary operating member.

4. The vacuum blower according to claim 3, wherein the rotary operating member is provided in the front end portion of the nozzle.

5. The vacuum blower according to claim 4, wherein:
    the front end turn portion serves as the rotary operating member; and
    the front end turn portion and the inner pipe form the cam mechanism.

6. The vacuum blower according to claim 3, wherein the rotary operating member is provided in the base end portion of the nozzle.

7. The vacuum blower according to claim 6, wherein:
    the base end turn portion serves as the rotary operating member; and
    the base end turn portion and the inner pipe form the cam mechanism.

* * * * *